United States Patent
Englander

(10) Patent No.: US 6,282,771 B2
(45) Date of Patent: Sep. 4, 2001

(54) METHOD FOR FORMING CONSTANT RADIUS CONVEX MIRROR ASSEMBLY

(75) Inventor: Benjamin Englander, Jamaica, NY (US)

(73) Assignee: Rosco Incorporated, Jamaica, NY (US)

( * ) Notice: Subject to any disclaimer, the term of this patent is extended or adjusted under 35 U.S.C. 154(b) by 0 days.

(21) Appl. No.: 09/750,938

(22) Filed: Dec. 29, 2000

Related U.S. Application Data

(63) Continuation of application No. 09/448,579, filed on Nov. 23, 1999, now Pat. No. 6,227,674.

(51) Int. Cl.[7] ................................................. B23P 11/02
(52) U.S. Cl. ................................................. 29/450; 29/428
(58) Field of Search ........................................ 29/428, 450

(56) References Cited

FOREIGN PATENT DOCUMENTS

11090964 * 4/1999 (JP) .

* cited by examiner

*Primary Examiner*—S. Thomas Hughes
*Assistant Examiner*—Steven Blount
(74) *Attorney, Agent, or Firm*—Ostrolenk, Faber, Gerb & Soffen, LLP

(57) ABSTRACT

A safety mirror lens assembly includes a mirror unit with a mirror lens that has a three-dimensional convex/ellipsoid reflective surface which terminates in an oval or round or other shape peripheral edge. The reflective surface is such that a notional line traced to coincides with the major axis has a first constant radius of curvature and a second notional line traced to coincide with the minor axis has a second constant radius of curvature. The first radius of curvature is substantially greater than the second radius of curvature. The mirror lens is usable for a cross-over mirror for a vehicle, for example, a school bus.

6 Claims, 2 Drawing Sheets

METHOD FOR FORMING CONSTANT RADIUS CONVEX MIRROR ASSEMBLY

RELATED APPLICATION

This is a continuation application under the provisions of 37 C.F.R. 1.53(b) of pending application Ser. No. 09/448,579, filed Nov. 23, 1999, now U.S. Pat. No. 6,227,674, by BENJAMIN ENGLANDER, entitled OVAL, CONSTANT RADIUS CONVEX MIRROR ASSEMBLY, the contents of which application is hereby incorporated by reference.

BACKGROUND OF THE INVENTION

This invention generally relates to convex, three dimensional mirrors and, more particularly, to a mirror assembly, sometimes referred to as a "cross-over" mirror, which affords a bus driver, for example, a school bus driver, visual access in front of the school bus which is hidden from direct view as well as alongside the bus. Such cross-over mirrors can however also be used at the rear corners of a vehicle such as with trucks, mail vans and the like.

For many decades, cross-over mirrors and mirror assemblies have been deployed on school buses and are in fact required by federal and local regulations. A substantial body of prior art has been published describing various mirrors of the type to which the present invention relates. An exemplary list of such prior art includes U.S. Pat. Nos. 4,822,157; 4,730,914; 4,436,372; 5,084,785; 5,589,984 and Des. 346,357. The above list represents but a fraction of the extensive prior art on the subject of cross-over mirrors and their accessories such as mounting hardware, mirror poles and other implements by which such mirror assemblies are secured to vehicles such as busses, school buses, trucks and the like. The contents of the aforementioned United States patents are incorporated by reference herein.

The convex, three-dimensional surface of the mirror lens described, for example, in the aforementioned U.S. Pat. No. 4,436,372, terminates in a continuous, peripheral edge which is essentially circular. That (and other similar) mirrors have a generally elliptical, i.e. dome, shape.

In more recent years, the prior art has moved to provide convex, three dimensional mirror lens surfaces that have a more stretched, elongate general shape. The aforementioned U.S. Pat. Nos. 4,822,157; 4,730,914; 4,436,372; 5,084,785; 5,589,984 and the Des. 346,357 illustrate the general style of such mirrors.

For the purposes of the present invention it is important to note that, essentially as a rule, the three dimensional, generally elliptical or convex surfaces of the aforementioned elongate cross-over mirror lens were provided with radii of curvature (measured along planar cross-sections) which were measurably non-constant, i.e. tending to increase or decrease from the center point on the mirror lens toward its peripheral, circumferential edge.

As an example, the convex, ellipsoid mirror lens shown in U.S. Pat. No. 4,436,372 has a generally flatter, i.e. less curved, center surface, which surface curves sharper as one proceeds toward the peripheral edge. Stated differently, the "radius of curvature" of the surface decreases from the center where the major and minor axis of the mirror surface intersect toward the peripheral edge of the mirror. A similar relationship is specifically claimed for the elongate, oval mirror that is described in the aforementioned U.S. Pat. No. 5,589,984. In another patent, an opposite relationship is specified—the sharpest curvature is at the center, as the mirror surface flattens out as one proceeds toward the peripheral edge. In the mirror lens of the U.S. Pat. No. 4,730,914, the inventors stress the fact that the mirror surface has a generally constant radius of curvature at a central portion of the mirror representing about one half of the entire surface and different radii of curvature at the other portions of the mirror lens.

In part, the present inventor perceives that the prior art was constrained by the type of technology commonly used in the industry for forming a mirror lens, which technology inherently imparts non-uniform radii of curvature to the mirror lens. Indeed, at least some people adhered to a conventional wisdom that it is desirable to vary the radius of curvature so as to obtain a larger and less distorted image at the mirror center, but a greater field of view, through the provision of a more distorted image, at the peripheral regions on the mirror. The idea is to increase the space that the mirror monitors in and around the school bus or the like.

SUMMARY OF THE INVENTION

It is an object of the present invention to provide an elongate, generally oval, convex/ellipsoid mirror lens that improves the ability to discern the movements of children around and about school buses and other types of vehicles.

The foregoing and other objects of the present invention are realized by an oval mirror lens and associated mounting parts which allow the mirror lens to be mounted to a vehicle to provide a field of view in front of and alongside of the vehicle. The mirror lens is oval, substantially convex and has, due to its oval shape, a major axis and a minor axis. These axes intersect one another at right angles at the center point (or apex) of the lens.

The mirror lens has an oval-shaped peripheral edge and the key aspect of the invention resides in the fact that a line traced along the major axis of the lens from one point on the periphery to the juxtaposed, opposite point on the periphery has a first constant radius of curvature. Similarly, a line traced on the surface of the lens along the minor axis from one end point on the periphery to the juxtaposed point on the periphery has a second radius of curvature. The first radius of curvature is larger than the second radius of curvature. The resulting mirror surface produces images of objects which more faithfully maintain the width and height proportions of the object, e.g. a child's image, that is reflected from different portions of the mirror lens.

The present invention also relates to a method for fabricating the mirror lens of the present invention to attain a lens having the constant radii of curvature feature referenced above.

Thus, the present invention revolves around the notion that one obtains a mirror in which the height/width proportions of objects placed around the school bus are subject to less variation, as compared to mirrors of the prior art. By means of the novel mirror of the present invention, a bus driver is less likely to lose sight of a child moving about the school bus, which is of course very important to the safety of our children.

Other features and advantages of the present invention will become apparent from the following description of the invention which refers to the accompanying drawings.

DETAILED DESCRIPTION OF EMBODIMENTS OF THE INVENTION

Figure 5B:
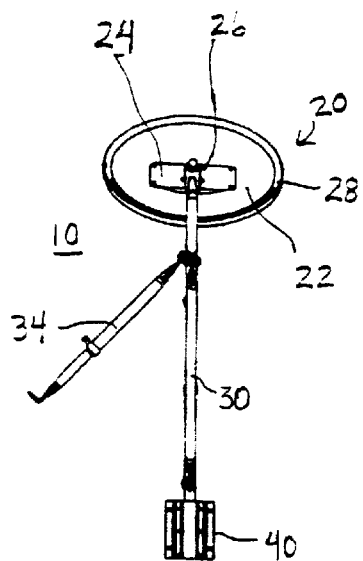
FIGS. 5a and 5b show the mirror of the present invention with bracketry and mounting hardware for mounting the same to a vehicle body.
Figure 5A:
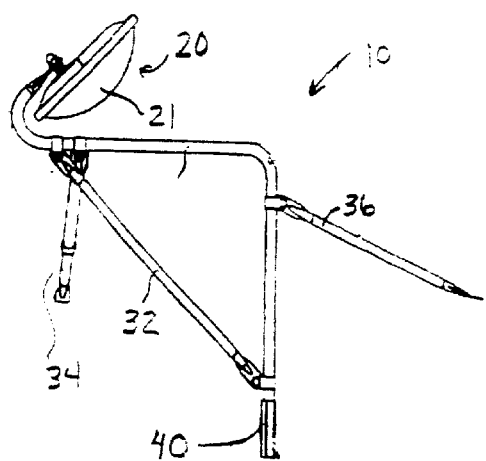

With reference to the drawings, the present invention relates to a cross-over mirror assembly 10 (FIGS. 5a and 5b) which broadly comprises a mirror unit 20 which is supported by a mirror pole 30 which is in turn attached to a vehicle body by a mirror pole mount 40. Mirror pole braces, such as the braces 32, 34 and 36, serve to stiffen the structure and to assist in the attachment of the mirror unit 20 to a vehicle body in a manner which dampens vibrations.

The present invention focuses on the mirror lens 21 and, more specifically, on the precise shape of its three-dimensional body. First, it is noted (with reference to FIG. 5b) that the mirror lens 21 has afixed to the rear thereof a mirror back 22 which is attached to the mirror lens body 21 by a gasket 28, which may be made of rubber or of any resilient synthetic material. The mirror back 22 supports a coupling plate 24 which in turn supports a mirror pole attachment that is known in the art. For example, it can be a tunnel mount style or a swivel ball style mirror pole attachment.

With reference to FIG. 1, the mirror lens body 21 has a front surface 23 which is coated with a reflective substance to form a reflective surface. The rear (not shown) of the mirror lens body 21 is non-reflective, but it may be reflective. The peripheral edge 29 (FIG. 2) of the mirror lens body 21 is oval shaped and coincides with the contour of the gasket 28.

Figure 1A:
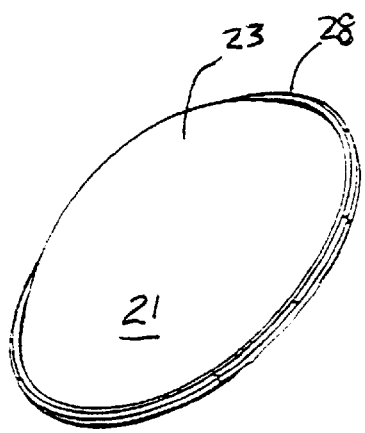
FIGS. 1a, 1b, 1c, and 1d are, respectively, a perspective, a rear view, a first side view, and a second side view, of the mirror of the present invention.
Figure 1B:
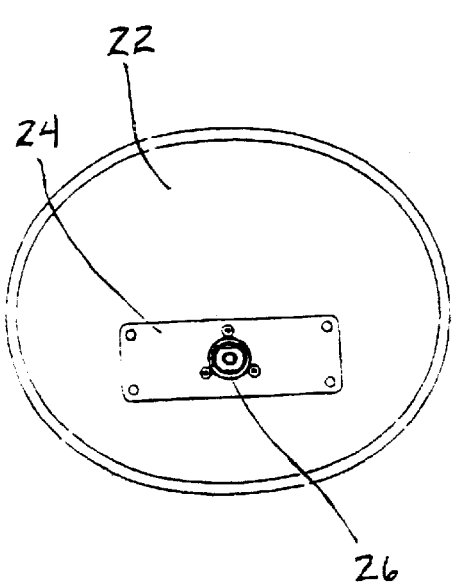
Figure 1C:
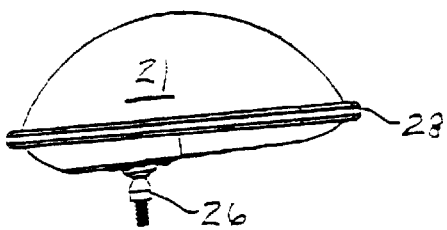
Figure 1D:
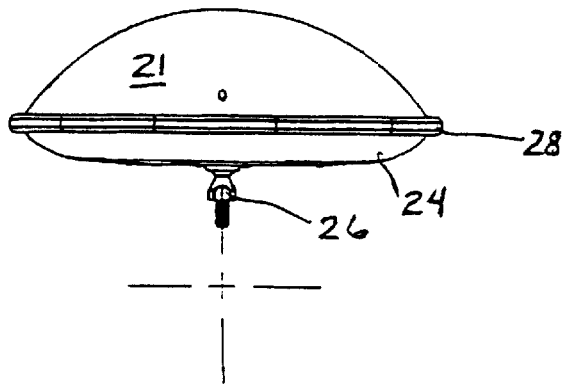

FIGS. 1b, 1c, and 1d together show the mirror unit 20 including the backplate 24 and the coupling structure 26 which as illustrated can be a swivel bolt joint to which a mirror pole can be attached by suitable bracketry (not shown).

The point of novelty of the present invention lies in the careful formation of the shape of the outer surface 23 of the mirror lens body 21. The lens body 21 is defined by an oval shaped peripheral edge 29 and its convex/ellipsoid body which is so contoured as to attain certain radius of curvature relationships as described below.

Figure 2:
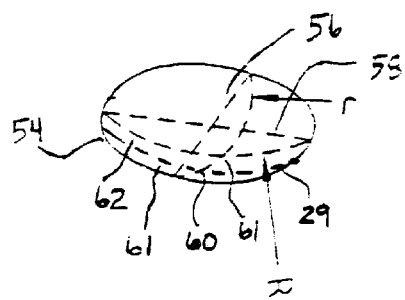
FIG. 2 is a line drawing which shows the curved lines that are defined by the mirror lens of the present invention along the major and minor axes thereof.

With reference to FIG. 2, it is an essential feature of the present invention that a line 62 that is traced along the outer reflective surface 23 of the mirror lens, which line coincides with the major axis 58 of the mirror lens body, has a first constant radius of curvature. Similarly, a notional line 60 traced along the mirror surface, which line 60 coincides with the minor axis 56 of the mirror lens outer reflective surface, has a second, different but constant radius of curvature. The two notional lines 60 and 62 intersect at the center, i.e., apex, of the reflective surface 23.

The aforementioned radius of curvature relationships have been selected for the cross-over mirror lens of the present invention in order to reduce variations in the height and width proportional dimensions of images of objects on the mirror surface, as the objects move around or about the bus, or in other words, as the object image moves away from the center region of the mirror lens towards its peripheral regions (closer to the peripheral edge 29).

In the embodiment of the present invention, the first radius of curvature "R" is nearly 50% larger than the radius curvature "r" which coincides with a minor axis of the oval perimeter 29 of the mirror lens. Preferably, the size of the first major axis is in the range of from about 10 to 14 inches and the second minor axis ranges between 7.5 to 11.5 inches.

Figure 4:
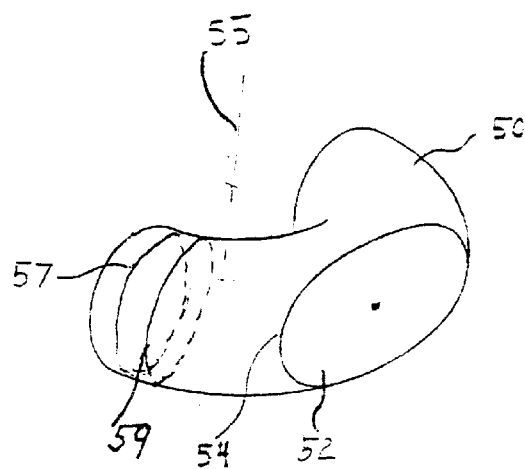
FIG. 4 shows a torus of which a slice has been taken to fabricate the mirror lens of the present invention.

It is not a trivial task to produce a mirror lens of having the parameters outlined above. With reference to FIG. 4, it is noted that one mode of obtaining the mirror shape of FIG. 2 is by taking a slice of the torus structure 50 shown in FIG. 4. Such hollow torus 50 (only a portion of which is illustrated) circumscribed or surrounds an axis 55. Therefore, in accordance with basic geometrical principles, the outermost peripheral line of the torus 50 has a constant radius of curvature about the axis 55. Yet again, any cross section 57, 59 (FIG. 4) of the torus taken in a plane that contains the axis 55 describes a circle of constant radius that is equal to "r."

Therefore, if a portion of the torus is cut away to produce a toroidal segment, that toroidal segment constitutes the three-dimensional mirror lens shown in FIG. 2. The line 54 in FIG. 4 is the segment cutting line and that line 54 coincides with peripheral edge 29 of the mirror lens of FIG. 2. The toroidal segment 52 is cut away from the toroid 50, for example by a cutting plane that extends parallel to the axis line 55 and perpendicular to a line extending from the center of the segment 52 to the axis 55 to which it is also perpendicular. Any trace on the lens surface that lies in a plane that also contains the axis 55 has a constant radius of curvature "r." On the other hand, any trace on the lens surface that lies in a plane that is parallel to the plane containing the longitudinal trace 62 has a constant radius of curvature. The actual radius of curvature of such traces that are successively traced below and then above the trace line 62 in FIG. 2 is larger, the closer the trace is to the trace line 62.

The toroidal segment constituting the lens body 21 of the present-invention is preferably fabricated by injection molding which, while being a well known molding technique, has not been typically used in the fabrication of mirror lens of the type described herein. To this end, it is possible to prepare a mold having a toroidal segment shape described above and to inject that mold with suitable material to form the lens body 21.

Figure 3:
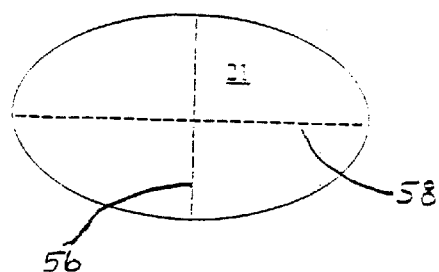
FIG. 3 shows the oval, peripheral outline of the present invention with the major or minor axes superimposed thereon.

FIG. 3 diagrammatically illustrates the peripheral edge 29 of the mirror lens including its major axis 58 and minor axis 56.

This invention can also be applied to round, spherical, three-dimensional mirror lenses wherein the axes (major and minor) are equal. The radius of curvature will be equal and constant along all notional lines traced along the outer surface which also intersect the center point of the outer surface, i.e., which pass through the axis of the spherical body.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of fabricating a mirror unit, comprising the steps of:

producing by injection molding, a mirror lens having a reflective outer surface and a rear surface, the mirror lens comprising a mirror lens body which terminates in an oval shape peripheral edge that surrounds the reflective surface, the mirror lens body being a substantially three-dimensional, convex body having a major axis of a first length and a minor axis which intersects the major axis and has a second length, the major axis and the minor axis being defined in a plane that contains the oval shape peripheral edge, the outer mirror surface having a first constant radius of curvature along a first line thereof which coincides with the major axis and having a second, constant radius of curvature on the outer surface thereof along a second line which coincides with the minor axis of the lens, said first constant radius of curvature being substantially larger than said second constant radius of curvature; and providing a mirror back and coupling the mirror back to the mirror lens body; and providing a coupling structure and attaching the coupling structure to the mirror back.

2. The method of claim 1, including attaching the mirror back to the lens by means of a gasket made of resilient synthetic material.

3. The method of claim 1, in which the mirror lens body comprises a plurality of notional trace lines each of which has said second, constant radius of curvature, wherein each of said plurality of trace lines lies in a plane which also contains said vertical axis.

4. The method of claim 3, in which the mirror lens body includes a second plurality of notional trace lines, each one of said second plurality of notional trace lines having a respective, constant radius of curvature.

5. A method of fabricating a mirror unit comprising the step of:

producing by injection molding, a mirror lens having a reflective outer surface and a rear surface, the mirror lens comprising a mirror lens body which terminates in a circular peripheral edge that surrounds the reflective surface, the mirror lens body being a substantially three-dimensional, spherical body, the outer mirror surface having a constant radius of curvature along any trace line thereof which begins at a first point on the peripheral edge, terminates on a second point on the peripheral edge and lies in a plane that also contains a vertical axis around which the spherical mirror lens body is symmetrically arranged, each trace line having the same constant radius of curvature; and attaching to the mirror lens a mirror assembly structure including a mirror back adjacent the continuous peripheral edge of the mirror lens; a fastening structure for fastening the mirror back to the mirror lens; and a coupling structure attached to the mirror back, the coupling structure including hardware for engaging a mirror pole which serves to attach the mirror unit to a vehicle body in a manner which allows the orientation of the mirror lens to be adjusted.

6. A method of fabricating a mirror unit comprising the steps of:

producing by injection molding, a mirror lens having a reflective outer surface and a rear surface, the mirror lens comprising a mirror lens body which terminates in a peripheral edge that surrounds the reflective surface, the mirror lens body having a substantially three-dimensional, spherical body, the outer mirror surface having a constant radius of curvature along any straight, unidirectional trace line thereof, which trace line begins at a first point on the peripheral edge and terminates on a opposed second points on the peripheral edge; and attaching to the mirror lens a mirror assembly structure including a mirror back adjacent the peripheral edge of the mirror lens; a fastening structure for fastening the mirror back to the mirror lens; and a coupling structure attached to the mirror back, the coupling structure including hardware for engaging a mirror pole which serves to attach the mirror unit to a vehicle body in a manner which allows the orientation of the mirror lens to be adjusted.

* * * * *